(12) United States Patent
Hollman et al.

(10) Patent No.: US 8,511,971 B2
(45) Date of Patent: Aug. 20, 2013

(54) ONE-PIECE COMPRESSOR AND TURBINE CONTAINMENT SYSTEM

(75) Inventors: Timothy M. Hollman, San Diego, CA (US); Kevin K. Taft, La Mesa, CA (US); Jang Y. Jo, Chula Vista, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 451 days.

(21) Appl. No.: 12/842,164

(22) Filed: Jul. 23, 2010

(65) Prior Publication Data

US 2012/0020771 A1    Jan. 26, 2012

(51) Int. Cl.
*F04D 29/44* (2006.01)

(52) U.S. Cl.
USPC ...... 415/121.2; 415/196; 415/200; 415/219.1

(58) Field of Classification Search
USPC ............... 415/182.1, 196, 200, 211.2, 213.1, 415/219.1
See application file for complete search history.

(56) References Cited

U.S. PATENT DOCUMENTS

| | | | |
|---|---|---|---|
| 4,302,150 A * | 11/1981 | Wieland | 415/207 |
| 4,930,978 A * | 6/1990 | Khanna et al. | 415/58.3 |
| 5,167,488 A | 12/1992 | Ciokajlo | |
| 5,237,817 A * | 8/1993 | Bornemisza et al. | 60/226.1 |
| 6,059,523 A | 5/2000 | Modafferi | |
| 6,468,026 B1 | 10/2002 | Bonnoitt | |
| 6,968,697 B2 * | 11/2005 | Nguyen et al. | 60/772 |
| 7,232,289 B2 | 6/2007 | Dong | |
| 2008/0232951 A1* | 9/2008 | Cardarella | 415/9 |

* cited by examiner

*Primary Examiner* — Nathaniel Wiehe
*Assistant Examiner* — Justin Seabe
(74) *Attorney, Agent, or Firm* — Kinney & Lange, P.A.

(57) ABSTRACT

A compressor shroud for containing fragments of a compressor impeller and a turbine wheel within a gas turbine engine. The compressor shroud includes a compressor containment section, a turbine containment section, and a containment continuity section. The containment continuity section connects the compressor containment section and the turbine containment section to form a one-piece part.

18 Claims, 1 Drawing Sheet

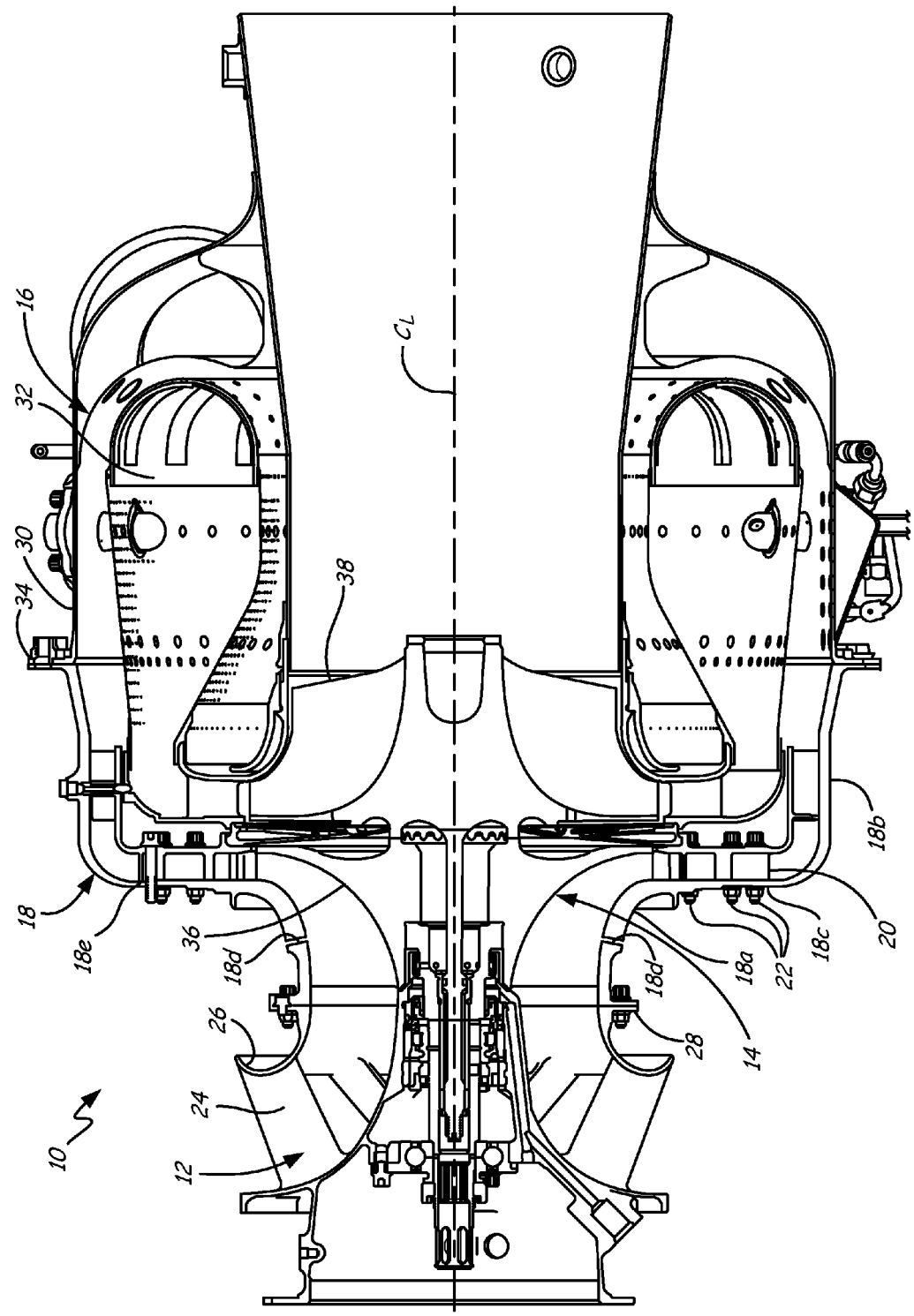

ONE-PIECE COMPRESSOR AND TURBINE CONTAINMENT SYSTEM

STATEMENT OF GOVERNMENT INTEREST

The U.S. Government has a paid-up license in this invention and the right in limited circumstances to require the patent owner to license others on reasonable terms as provided for by the terms of Contract No. N00019-06-C-0081, Sub-Contract No. 4500019224 awarded by the United States Navy.

BACKGROUND

The present invention relates to gas turbine engines. In particular, the invention relates to containment systems for gas turbine engines.

Gas turbine engines employ two relatively large components that rotate at very high speeds. These are a compressor impeller and a turbine wheel. The compressor impeller compresses incoming air which is directed to a combustion chamber, mixed with fuel and ignited. The turbine wheel is propelled by rapidly expanding gases resulting from the combustion of the fuel and the compressed incoming air. The compressor impeller is linked to, and powered by, the turbine wheel. Mechanical failure of either of these two components can result in considerable damage to the gas turbine engine. In some cases, pieces of the failed component may contain enough kinetic energy to penetrate a gas turbine engine housing and cause considerable damage outside the gas turbine engine. Therefore, it is frequently a requirement that the compressor impeller and the turbine wheel each have a containment device or system to prevent such flying fragments from escaping the engine.

Typically, a compressor impeller or turbine wheel containment system is a metal band or a series of metal bands surrounding either the compressor impeller section or the turbine wheel section of the engine. Such containment systems add weight, which reduces efficiency for gas turbine engines in transportation applications in general and is particularly problematic for applications aboard aircraft.

SUMMARY

The present invention includes a compressor shroud for containing fragments of a compressor impeller and a turbine wheel within a gas turbine engine. The compressor shroud includes a compressor containment section, a turbine containment section, and a containment continuity section. The containment continuity section connects the compressor containment section and the turbine containment section to form a one-piece part.

BRIEF DESCRIPTION OF THE DRAWING

The FIGURE is a cross-sectional view of a gas turbine engine incorporating the present invention.

DETAILED DESCRIPTION

Conventional containment systems in gas turbine engines for a compressor impeller and a turbine wheel are separate, additional components adding weight and complexity. In addition, in conventional gas turbine engines, portions of engine components, such as a forward inlet bell mouth of a bearing capsule or a combustor assembly, are positioned radially outward from the compressor impeller or the turbine wheel, forcing compromises in manufacturing methods and material choices for these key components to enable them to not only perform their respective primary functions, but to contain flying fragments as well. Finally, conventional gas turbine engines have a flange connection between a compressor shroud and a combustor housing that is positioned radially outward from the compressor impeller or the turbine wheel. Such a flange connection is the weakest link in a conventional containment system.

The present invention solves these problems by extending the compressor shroud such that it is axially around both the compressor impeller and the turbine wheel. The extended compressor shroud is thickened as necessary to insure containment of flying fragments. The traditional separate containment systems for the compressor impeller and the turbine wheel are eliminated, reducing weight and complexity. With the compressor shroud providing containment, the forward inlet bell mouth and the combustor assembly no longer need to provide containment. This permits the use of manufacturing methods and materials better suited to their primary functions. Finally, the extended, one-piece compressor shroud has no flange connection positioned radially outward from the compressor impeller and the turbine wheel, improving reliability by removing the weakest link in a containment system.

The FIGURE illustrates a gas turbine engine incorporating the present invention. The FIGUREs show gas turbine engine 10 includes bearing capsule 12, rotor assembly 14, combustor assembly 16, compressor shroud 18, diffuser 20, and bolts 22. Bearing capsule 12 includes forward inlet 24, bell mouth 26, and forward inlet flange 28. Combustor assembly 16 includes combustor housing 30, combustor chamber 32, and combustor flange 34. Rotor assembly 14 includes compressor impeller 36 and turbine wheel 38. Compressor shroud 18 is a single piece, comprising compressor containment section 18a, turbine containment section 18b, containment continuity section 18c, bleed slots 18d, and bolt holes 18e.

Bearing capsule 12 attaches to compressor impeller 36 and to turbine wheel 38 of rotor assembly 14 along centerline axis $C_L$, connecting compressor impeller 36 to turbine wheel 38. Compressor shroud 18 axially surrounds compressor impeller 36 and turbine wheel 38 of rotor assembly 14 with compressor containment section 18a axially surrounding compressor impeller 36, turbine containment section 18b axially surrounding turbine wheel 38, and containment continuity section 18c between compressor containment section 18a and turbine section 18b. A first flanged end of compressor shroud 18 coextensive with an end of compressor impeller 36 farthest from turbine wheel 38, attaches to bearing capsule 12 at forward inlet flange 28. Forward inlet flange 28 is adjacent to bell mouth 26, which contains forward inlet 24. A second flanged end of compressor shroud 18 coextensive with an end of turbine wheel 38 farthest from compressor impeller 36, attaches to combustor assembly 16 at combustor flange 34. Combustor flange 34 is adjacent to combustor housing 30, which contains combustion chamber 32. Compressor shroud 18 also includes bleed slots 18d in compressor containment section 18a. Bleed slots 18d provide compressed air for other aircraft systems and help regulate pressure around compressor impeller 36 to prevent engine performance problems, such as engine surge or blow-out. In the present invention, bleed slots 18d are angled through compressor shroud 18 at an angle away from a radial orientation with respect to centerline axis $C_L$, such that there is no direct radial path from compressor impeller 36 through bleed slots 18d. Diffuser 20 is attached to compressor shroud by bolts 22 passing through bolt holes 18e.

In operation, air enters forward inlet 24 of bearing capsule 12 at bell mouth 26 and is compressed by the centrifugal action of compressor impeller 36. The compressed air is directed by compressor shroud 18, through diffuser 20, and into combustor housing 30 where it mixes with fuel and is ignited to produce a flame in combustor chamber 32. Diffuser 20 comprises a series of impediments to air flow, such as angled vanes, to slow the compressed air, and increase its pressure, thereby preventing the compressed air from blowing out the flame in combustion chamber 32. High temperature gases produced by the flame expand rapidly and propel turbine wheel 38. Turbine wheel 38, through its attachment to bearing capsule 12, drives compressor impeller 36 and any additional systems attached to bearing capsule 12. Compressor shroud 18 is an essential element of gas turbine 10, directing compressed air from forward inlet 24, through diffuser 20, to combustion housing 30.

In the present invention, compressor shroud 18 also serves a second essential function by providing containment of flying fragments for both compressor impeller 36 and turbine wheel 38 by extending axially around both components, as described above and illustrated in the FIGURE. In order to accomplish this second function, compressor shroud 18 is thicker than compressor shrouds that do not provide containment and is made of materials not normally used for compressor shrouds. Compressor shroud 18 is not of uniform thickness but is thicker in some areas to provide sufficient containment. The thickness of containment shroud 18 varies with proximity to a rotary component and expected incident angle of impact for flying fragments. For example, compressor containment section 18a is thicker to provide the necessary containment for compressor impeller 36, turbine containment section 18b is thicker to provide the necessary containment for turbine wheel 38, but need not be as thick as compressor containment section 18a. Containment continuity section 18c is thinnest of all because it is much more angled to a likely impact from a flying fragment compared to compressor continuity section 18a or turbine containment section 18b. Containment continuity section 18c has bolt holes 18e to accommodate bolts 22 for attaching diffuser 20 to containment shroud 18. Also, as mentioned above, bleed slots 18d are angled through compressor shroud 18 such that there is no direct radial path from compressor impeller 36 through bleed slots 18d. This prevents flying fragments from compressor impeller 36 from passing unimpeded through compressor shroud 18 via bleed slots 18d.

Containment shroud 18 is made of a material with mechanical properties desirable for containment, such as high strength and stability at high temperatures to provide resistance to piercing, as well as high elongation properties to provide high hoop tension. A suitable material is a nickel super alloy, for example, Inconel® 625. Containment shroud 18 is manufactured by a method that further enhances the desired mechanical properties, such as forging. Other manufacturing methods, such as casting, do not achieve the necessary strength for a given material thickness, requiring more material and greater weight to perform the same containment function. However, casting is more suitable than forging in creating more intricate and complex parts, such as bearing capsule 12 with bell mouth 26. The complex shape of bell mouth 26 is critical for aerodynamics. The present invention, with the first flanged end of compressor shroud 18 coextensive with an end of compressor impeller 36 farthest from turbine wheel 38, removes any containment requirement from bearing capsule 12, permitting bearing capsule 12 to be cast without requiring extra material in bearing capsule 12 to provide a containment function.

As shown in the FIGURE, combustor assembly 16 also does not need to perform any containment function in the present invention. This permits a more efficient design, with no need to accommodate or work around a separate containment band within combustor assembly 16. A combustor flange for a combustor assembly in a conventional gas turbine engine is located approximately between the gas turbine engine's compressor impeller and turbine wheel, thus requiring at least a portion of the combustor assembly to provide containment for the turbine wheel. In the present invention, combustor flange 34 is not positioned axially around turbine wheel 38, so there is no need for combustor assembly 16 to provide containment.

As noted above, conventional gas turbine engines have a combustor flange between a compressor shroud and a combustor housing that is positioned radially outward from either the compressor impeller or the turbine wheel. This flange typically represents the weakest link in a conventional containment system. The present invention, with single piece compressor shroud 18 providing containment for both compressor impeller 36 and turbine wheel 38 as described above, has no flanges in the region radially outward from compressor impeller 36 or turbine wheel 38. This feature eliminates the weakest link in a containment system.

Finally, replacing three components, a conventional compressor shroud, a conventional compressor impeller containment system and a conventional turbine wheel containment system with one component, compressor shroud 18, provides significant benefits in simplifying and reducing costs associated with manufacturing, assembling, and controlling inventory. Attaching compressor shroud 18 is no more difficult than attaching any conventional compressor shroud, but the operations necessary to manufacture, inventory, deliver and attach the conventional compressor impeller containment system and the conventional turbine wheel containment system are completely eliminated. In addition, moving from three components to one also provides an opportunity for weight savings, which is important in transportation applications and critically important in aircraft applications.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gas turbine engine apparatus comprising:
   a compressor impeller;
   a turbine wheel axially connected to the compressor impeller;
   a one-piece compressor shroud comprising:
      a compressor containment section disposed axially around the compressor impeller for containing fragments of the compressor impeller within the gas turbine engine; and
      a turbine containment section disposed axially around the turbine wheel for containing fragments of the turbine wheel within the gas turbine engine;
      the one-piece compressor shroud extending axially from an end of the compressor impeller farthest from the turbine wheel to an end of the turbine wheel farthest from the compressor impeller.

2. The apparatus of claim 1, wherein the one-piece compressor shroud is comprised of a nickel super alloy.

3. The apparatus of claim 1, wherein the one-piece compressor shroud is comprised of a forged nickel super alloy.

4. The apparatus of claim 1, wherein a diameter of the one-piece compressor shroud at the compressor containment section is less than a diameter of the one-piece compressor shroud at the turbine containment section.

5. The apparatus of claim 1, wherein the one-piece compressor shroud further comprises:
a containment continuity section between the compressor containment section and the turbine containment section.

6. The apparatus of claim 5, wherein the containment continuity section extends radially between the containment continuity section and the turbine containment section.

7. The apparatus of claim 5, further comprising:
a diffuser; and
a plurality of bolts for connecting the diffuser to the compressor shroud;
wherein the containment continuity section comprises a plurality of bolt holes for receiving the plurality of bolts.

8. A compressor shroud for containing fragments of a compressor impeller and a turbine wheel within a gas turbine engine, the compressor shroud comprising:
a compressor containment section;
a turbine containment section; and
a containment continuity section connecting the compressor containment section and the turbine containment section to form a one-piece part;
wherein a thickness of the compressor shroud at the compressor containment section is greater than a thickness of the compressor shroud at the turbine containment section, and the thickness of the compressor shroud at the turbine containment section is greater than a thickness of the compressor shroud at the containment continuity section.

9. The compressor shroud of claim 8, wherein a diameter of the compressor shroud at the compressor containment section is less than a diameter of the compressor shroud at the turbine containment section.

10. The compressor shroud of claim 8, wherein the containment continuity section extends radially between the containment continuity section and the turbine containment section.

11. The compressor shroud of claim 8, wherein the containment continuity section comprises a plurality of bolt holes.

12. The compressor shroud of claim 8, wherein the compressor containment section comprises a plurality of bleed slots, wherein the plurality of bleed slots are angled away from a radial orientation with respect to a rotational axis of the compressor impeller such that fragments of the compressor impeller cannot pass through the plurality of bleed slots unimpeded by the compressor shroud.

13. The compressor shroud of claim 8, wherein the compressor shroud is comprised of a nickel super alloy.

14. The compressor shroud of claim 8, wherein the compressor shroud is comprised of a forged nickel super alloy.

15. A method for containing fragments of a compressor impeller and a turbine wheel within a gas turbine engine comprising:
surrounding the compressor impeller and the turbine wheel in an axial direction with a one-piece compressor shroud for containing fragments of the compressor impeller and the turbine wheel within the gas turbine engine;
attaching the one-piece compressor shroud to a forward inlet flange, the attachment at an axial position radially outward from an end of the compressor impeller, the end of the compressor impeller being that farthest from the turbine wheel; and
attaching the one-piece compressor shroud to a combustor flange, the attachment at an axial position radially outward from an end of the turbine wheel, the end of the turbine wheel being that farthest from the compressor impeller.

16. The method of claim 15, further comprising attaching a diffuser to the one-piece compressor shroud prior to surrounding the compressor impeller and the turbine wheel in an axial direction with the one-piece compressor shroud.

17. The method of claim 16, wherein attaching the diffuser comprises fastening with bolts through bolt holes in the one-piece compressor shroud.

18. A gas turbine engine apparatus comprising:
a compressor impeller;
a turbine wheel axially connected to the compressor impeller;
a one-piece compressor shroud comprising:
a compressor containment section disposed axially around the compressor impeller for containing fragments of the compressor impeller within the gas turbine engine;
a turbine containment section disposed axially around the turbine wheel for containing fragments of the turbine wheel within the gas turbine engine; and
a containment continuity section between the compressor containment section and the turbine containment section;
wherein a thickness of the one-piece compressor shroud at the compressor containment section is greater than a thickness of the one-piece compressor shroud at the turbine containment section, and the thickness of the one-piece compressor shroud at the turbine containment section is greater than a thickness of the one-piece compressor shroud at the containment continuity section.

* * * * *